No. 819,292. PATENTED MAY 1, 1906.
F. LATIMER.
CAR WHEEL.
APPLICATION FILED DEC. 18, 1905.
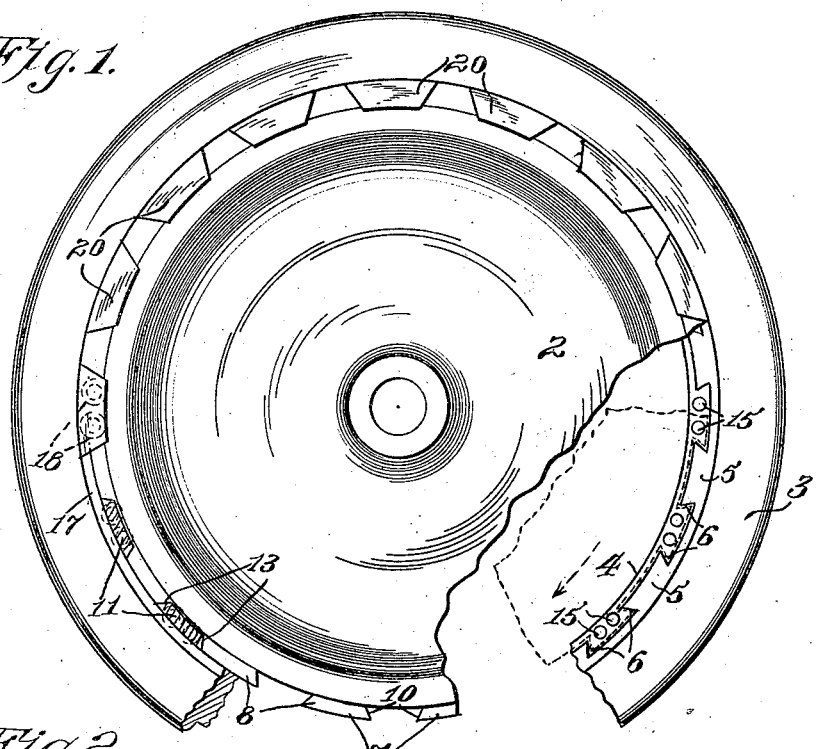
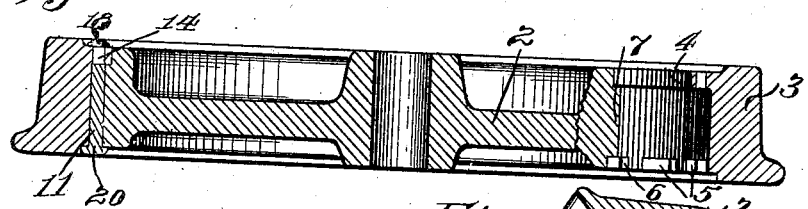
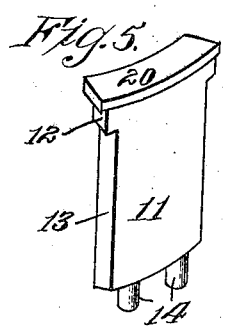
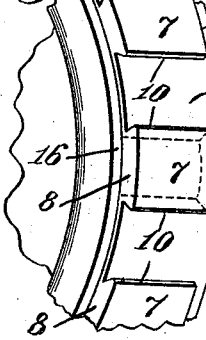
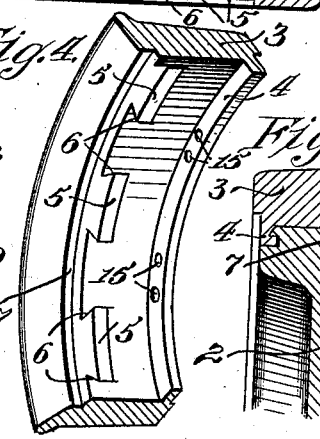
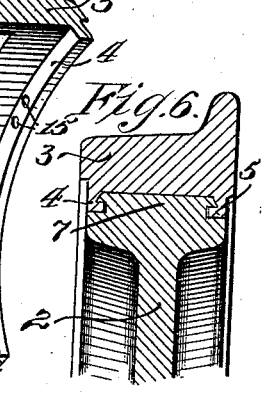
Witnesses:
F. E. Maynard
C. C. Fuss
Inventor:
Frank Latimer,
By his Attorney

UNITED STATES PATENT OFFICE.

FRANK LATIMER, OF HIGH BRIDGE, NEW JERSEY, ASSIGNOR OF ONE-HALF TO TAYLOR IRON AND STEEL COMPANY, OF HIGH BRIDGE, NEW JERSEY, A CORPORATION OF NEW JERSEY.

CAR-WHEEL.

No. 819,292.  Specification of Letters Patent.  Patented May 1, 1906.

Application filed December 18, 1905. Serial No. 292,175.

*To all whom it may concern:*

Be it known that I, FRANK LATIMER, a citizen of the United States, residing in High Bridge, in the county of Hunterdon and State of New Jersey, have invented certain new and useful Improvements in Car-Wheels, of which the following is a specification.

The present invention relates to car or locomotive wheels, the object being to provide an improved car-wheel, the center and tire of which are formed separately, but so connected that lateral play or movement of one part relatively to the other, which is a source of great trouble in wheels of this character, is entirely obviated.

A further object of the invention is the provision of an improved steel-tired wheel, the center of which, after the wearing down of the tire, can be readily re-tired and the tire of which is so locked to such center that should the tire in use split circumferentially the parts would still be locked to the center of the wheel in such manner as to prevent accident, and in which the locking means engage the tire throughout a relatively great area thereof, so that there is little opportunity for any part thereof, should the tire become broken, to fly away from the center.

In the drawings accompanying and forming a part of this specification, Figure 1 is a side view of this improved wheel, a part of the tire and center being broken away to illustrate the mode of assembling the same. Fig. 2 is a cross-sectional view thereof. Figs. 3 and 4 illustrate portions, respectively, of the center and tire. Fig. 5 is a perspective view of the locking device or key which assists in locking the two parts together, and Fig. 6 is a sectional view of a portion of a wheel having a somewhat different form of construction from that illustrated in Figs. 1, 3, and 4.

Similar characters of reference designate corresponding parts in the different figures of the drawings.

This improved wheel comprises a center 2, formed of any suitable material, and a tire 3, likewise formed of any suitable material, usually steel, and which may be an ordinary rolled-steel tire, or otherwise formed as may be desired, and which center may have any of the various forms of construction which may be desired to give to it, according to the service to which the wheel is to be put—that is to say, it may be of a web formation or a ribbed formation or a spoked formation. The parts in practice will usually be assembled by heating the tire to allow heat and permitting it to cool and shrink on the center.

For the purpose of connecting the tire and center together the tire is provided with a circumferential rib or projection 4 adjacent to one side thereof and on the opposite side with a series of projections or lugs 5, having locking ends 6, which in the present instance are shown as dovetailed.

The periphery of the center is provided with a series of locking members 7, shown of a relatively large area, preferably extending well across the periphery of such center, so that the ends 8 and 9 thereof will lie between and engage the peripheral rib 4 and the lugs or projections 5 of the tire when the parts are assembled in the manner hereinafter set forth. The sides or transverse faces 10 of these locking members conform to the ends of the locking-lugs of the tire, and therefore in the present instance are shown with dovetailed sides, so that the center may be inserted laterally into position with relation to the tire and then shifted circumferentially, so that the locking-lugs of the tire overlap the ends of the locking members of the center, which latter will thus, as stated, lie between the projections 5 and the circumferential rib 4 of such tire. In this position of the assembled parts the dovetailed ends of the locking-lugs of the tire are opposed to the dovetailed ends of the locking members of the center—that is to say, the ends of the lugs of the tire taper toward the tread of the wheel, while the side faces of the center locking members taper toward the hub of such wheel, so that such tapered faces may be considered as opposing each other and in this position form transverse ways or openings for the locking members 11. For locking the two members together after they are assembled in the manner indicated a locking device 11, which may be a drop-forging, is provided. It is shown having its side walls or faces tapered in opposite directions, as at 12 and 13, to correspond with the opposing tapered portions, respectively, of the tire-lugs 5 and center locking members 7. One of these locking members is inserted in each opening between a pair of lugs 5 of the tire and a pair of lugs 7 of the center, thus locking the one to the other in a manner that will be readily understood. Each locking device has a headed cap 20, so that it completely closes the opening formed between the coöperating lugs of the tire and center and project into the peripheral rib 4 of the tire, and for this purpose it may be formed in any suitable way. In the present instance each locking device is shown provided with a pair of projecting ends 14, extending into openings 15, passing through such rib, and which projections 14 may be upset at the outer side of such rib or threaded for the reception of nuts.

The center is provided with a circumferential shoulder 16, which engages the inner face of the circumferential rib 4 of the tire when the parts are assembled, so that from the foregoing it will be seen that the center and tire are clamped together sidewise, as well as peripherally, by means of the locking members, which need not necessarily project beyond the two sides of the tire since the same may be circumferentially ribbed, as at 17, at both sides to permit the upset ends of nuts 18 at one side and the heads 20 of such locking device at the other side to be located within the side faces of the tire.

In practice the locking-lugs 5 and circumferential rib of the tire may be laterally interlocked with the ends of the locking members 7 of the center, as illustrated, for instance, in Fig. 6, in which case, however, when the tire is shrunk on, it would be necessary to form the interlocking side portions so that they are somewhat spread apart and then roll them into position after the tire has been shrunk on.

Having thus described my invention, I claim—

1. A car-wheel comprising a tire, and a center interlocked transversely by independent dovetailed interlocking means.

2. A car-wheel comprising a tire and a center interlocked transversely by opposing and independent dovetailed interlocking means.

3. A car-wheel comprising a tire and a center having dovetailed interlocking means, which when assembled by inserting the dovetailed members of the center between the dovetailed members of the tire and shifting one of said members relatively to the other are locked together and locking members located in the openings formed between said dovetailed interlocking devices for locking said center and tire together.

4. A car-wheel having a tire provided with a circumferential rib on one side and a series of locking-lugs on the other side, a center having a series of locking members adapted to interlock with the locking-lugs of the tire when the parts are being assembled and to be shifted intermediate said locking-lugs and rib of the tire, and headed locking members located in the openings formed between the locking lugs and members of the tire and center respectively for locking said parts together, and having a part projecting into the circumferential rib of the tire and clamped at the outer side thereof.

5. A car-wheel having a tire provided with a circumferential rib on one side and a series of locking-lugs on the other side, a center having a series of locking members adapted to interlock with the locking-lugs of the tire when the parts are being assembled and to be shifted intermediate said locking-lugs and rib of the tire, and headed locking members located in the opening formed between the locking lugs and members of the tire and center respectively for locking said parts together, and having a part projecting into the circumferential rib of the tire and clamped at the outer side thereof, the side faces of the locking-lugs of the tire and center being dovetailed and opposing each other when assembled, and said locking member having dovetailed portions corresponding to the dovetailed portions of said lugs and locking members of the tire and center.

6. A car-wheel comprising a center and a tire, each having projections having an interlocking engagement during the assemblage of the tire and center and constructed to form ways or openings of similar formation to such projections, said tire and center being interlocked both transversely and circumferentially thereof, and locking means comprising independent members conforming to and fitting the said ways or openings for locking the tire and center together.

7. A car-wheel comprising a center and a tire interlocking both transversely and circumferentially thereof, the transverse locking means comprising independent dovetailed members.

8. A car-wheel having a tire and a center, one provided with one or more projections at one side of its periphery and with projecting means at the opposite side of its said periphery and the other having one or more projections located in alinement with the projection or projections of said first member when the tire and center are assembled, the said alined projections forming a way or ways at the sides thereof conforming to the shape of such projections, one or more locking members fitting said way or ways for holding the tire and center against circumferential shifting, and means for securing said locking member or members against transverse displacement.

9. A car-wheel comprising a center and a tire having dovetailed interlocking portions and assembled by a lateral and circumferential movement of one member relative to the other member, and a locking member having corresponding dovetailed faces for locking said tire and center together.

10. A car-wheel comprising a tire and a center each having dovetailed locking portions and assembled by a lateral and circumferential movement of one relative to the other, in which position the dovetailed faces of the locking members oppose each other, and headed locking devices having opposing dovetailed faces corresponding to the dovetailed faces of the tire and center and having a part clamped at one side of the wheel, whereby said tire and center are locked both laterally and circumferentially.

11. A car-wheel comprising a center and a tire having projections provided with interlocking faces to permit the assemblage of the tire and center and forming transverse ways or openings conforming to the shape of such projections, and locking members, each having interlocking faces corresponding to the shape of such projections for locking said tire and center together.

12. A car-wheel comprising a center and a tire having projections constructed to enable the tire and center to be assembled laterally and then one shifted circumferentially of the other to bring said projections into alinement transversely of the wheel, said projections having openings at their sides, and interlocking members fitting said openings and locking the tire and center together.

13. A car-wheel comprising a center and a tire having projections constructed to enable the tire and center to be assembled laterally and then one shifted circumferentially of the other to bring said projections into alinement transversely of the wheel and forming openings at the sides of said projections, interlocking members fitting said openings and locking the tire and center together, and means for securing said locking members in position whereby the tire and center are locked both circumferentially and transversely against movement relatively to each other.

14. A car-wheel comprising a center and a tire having projections constructed to enable the tire and center to be assembled laterally and then one shifted circumferentially of the other to bring said projections into alinement transversely of the wheel with the side faces of said projections opposed to each other, and interlocking members also having opposed locking-faces fitting the openings between said projections and locking the tire and center together.

FRANK LATIMER.

Witnesses:
 KNOX TAYLOR,
 PERCIVAL CHRYSTIE.

It is hereby certified that in Letters Patent No. 819,292, granted May 1, 1906, upon the application of Frank Latimer, of High Bridge, New Jersey, for an improvement in "Car-Wheels," the granting clause of the face of the patent erroneously states that the "Taylor Iron and Steel Company, its successors or assigns," are sole owners of said invention; whereas the said granting clause should read *Frank Latimer, his heirs or assigns and Taylor Iron and Steel Company, its successors or assigns;* said Taylor Iron and Steel Company being owner of one-half interest only, in said invention, as shown by the assignments of record in this office; and that the said Letters Patent should be read with this correction therein that the same may conform to the record of the case in the Patent Office.

Signed and sealed this 12th day of June, A. D., 1906.

[SEAL.]
F. I. ALLEN,
*Commissioner of Patents.*